United States Patent
Mauseth et al.

(10) Patent No.: US 10,332,223 B1
(45) Date of Patent: Jun. 25, 2019

(54) GEOGRAPHIC LOCALE MAPPING SYSTEM

(71) Applicant: MMSR, LLC, Colorado, CO (US)

(72) Inventors: Michael J. Mauseth, Denver, CO (US); Steve Roe, Greenwood Village, CO (US); Jason Sweezey, Centennial, CO (US)

(73) Assignee: MMSR, LLC, Denver, CO (US)

( * ) Notice: Subject to any disclaimer, the term of this patent is extended or adjusted under 35 U.S.C. 154(b) by 554 days.

(21) Appl. No.: 14/729,378

(22) Filed: Jun. 3, 2015

Related U.S. Application Data

(60) Provisional application No. 62/008,977, filed on Jun. 6, 2014.

(51) Int. Cl.
*G06Q 50/16* (2012.01)
*G06Q 10/00* (2012.01)

(52) U.S. Cl.
CPC .............. *G06Q 50/16* (2013.01); *G06Q 10/00* (2013.01)

(58) Field of Classification Search
CPC ...................................................... G06Q 50/16
See application file for complete search history.

(56) References Cited

U.S. PATENT DOCUMENTS

| | | | | |
|---|---|---|---|---|
| 6,691,114 B1* | 2/2004 | Nakamura | ........ | G06F 17/30241 |
| 7,050,990 B1* | 5/2006 | Chu | .................. | G06Q 30/0251 705/14.71 |
| 8,015,196 B2* | 9/2011 | Taranenko | ........ | G06F 17/30241 707/736 |
| 8,364,689 B2* | 1/2013 | Hao | .................... | G06F 17/3087 707/758 |
| 8,583,562 B1* | 11/2013 | McDaniel | .............. | G06Q 10/10 705/313 |
| 8,732,219 B1* | 5/2014 | Ferries | .............. | G06F 17/30241 707/723 |
| 9,753,945 B2* | 9/2017 | Jurca | ................. | G06F 17/30241 |
| 2014/0279757 A1* | 9/2014 | Shimanovsky | .... | G06Q 30/0282 706/12 |
| 2015/0168150 A1* | 6/2015 | Kahn | ..................... | H04W 4/21 701/408 |

OTHER PUBLICATIONS

Search Apartments and Homes—Rent.com; http://www.rent.com, 2 pages.
Citymaps—https://citymaps.com, 3 pages.
(Continued)

*Primary Examiner* — Kurtis Gills
(74) *Attorney, Agent, or Firm* — Holzer Patel Drennan

(57) ABSTRACT

The disclosed technology facilitates objective comparisons between different geographical locales based on statistical comparisons of associated distributions of locale attributes. According to one implementation, a method disclosed herein includes defining a benchmark cluster having a first distribution of locale attributes; identifying a plurality of locale clusters that each correspond to one of a number of locales within a search zone associated with a different distribution of the locale attributes; assessing satisfaction of a similarity condition by comparing the benchmark cluster and to one or more of the identified locale clusters; and outputting one or more of the locales corresponding to the identified locale clusters satisfying the similarity condition.

24 Claims, 10 Drawing Sheets

(56) References Cited

OTHER PUBLICATIONS

Heatmaps—New and Improved; https://www.zillow.com/blog/heatmaps-new-and-improved-3898, 4 pages.
Houses for Rent—Find Rental Homes, Apartments, Condos, Lofts at Rentals.com, https://www.rentals.com/, 4 pages.
'Match score' app puts Zillow On steriods | Inman—http://www.inman.com, 4 pages.

* cited by examiner

| Locale Attribute | Attribute Category | Description |
|---|---|---|
| X2012_1114 | Business Type | % BUS Type in that neighborhood |
| P_pop_MEY12 | Demographic | % Population in age group old |
| P_HH_pworkerY12 | Economic | %Households with # of workers |
| P_renterocc | Housing | %Renter occupied Housing Units & ownership cost >+x% |
| P_pop_education | Social | %Population with certain level of education |

SYSTEM INPUT

| CITY | # LOCALES |
|---|---|
| City A | 654 |
| City B | 778 |
| City C | 721 |
| City D | 1,383 |
| Total | 3,536 |

FIG. 7A

SYSTEM OUTPUT

| CLUSTER TYPE | # LOCALES | % LOCALES |
|---|---|---|
| 1 | 95 | 2.69% |
| 2 | 151 | 4.27% |
| 3 | 117 | 3.31% |
| 4 | 199 | 5.63% |
| 5 | 174 | 4.92% |
| 6 | 166 | 4.69% |
| 7 | 213 | 6.02% |
| 8 | 193 | 5.46% |
| 9 | 97 | 2.74% |
| 10 | 84 | 2.38% |
| 11 | 424 | 11.99% |
| 12 | 421 | 11.91% |
| 13 | 238 | 6.73% |
| 14 | 534 | 15.10% |
| 15 | 430 | 12.16% |
| Total | 3,536 | 100% |

FIG. 7B

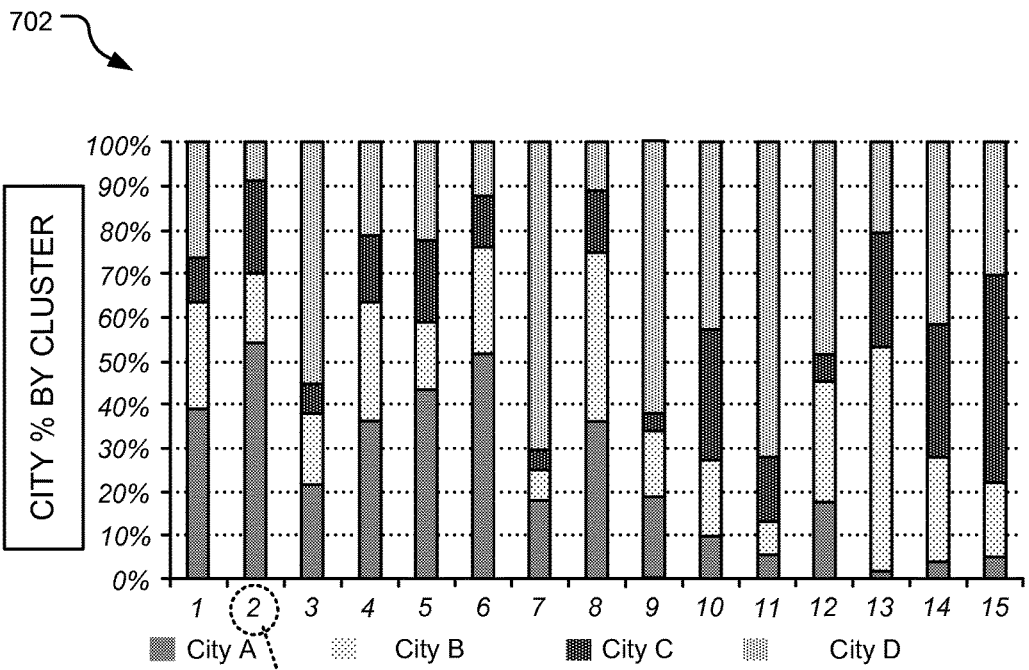

FIG. 7C

Locale Attribute Values of Example Cluster Type ("Cluster-2")

| | Type | Metrics | Cluster-2 | Total |
|---|---|---|---|---|
| Details of Cluster | Demo graphic | %Population in age group old | 62% ⇩ | 71% |
| | Economic | % Households with # of workers | 12% | 7% |
| | Housing | %Renter occupied Housing Units & ownership cost >=x% | 27% | 28% |
| | Business | %BUS type in that neighborhood | 0.44% ⇧ | 0.19% |
| | Great School | %Population with certain level of education | 8% ⇩ | 16% |

GEOGRAPHIC LOCALE MAPPING SYSTEM

CROSS-REFERENCE TO RELATED APPLICATIONS

The present application claims benefit of priority to U.S. Provisional Application No. 62/008,977, entitled "Locale Characterization and Comparison" and filed on Jun. 6, 2014, which is specifically incorporated by reference for all that it discloses or teaches.

BACKGROUND

The Internet provides a number of useful tools for individuals researching geographical locales in unfamiliar locations. For example, a user may be able to view various online listings or use a search engine to retrieve some information regarding population or housing demographics in a particular geographical area of interest. However, existing tools do not readily facilitate objective comparisons between different geographical locations.

SUMMARY

Implementations described and claimed herein provide for comparison of two or more locales based on various locale attributes (e.g., demographics, property information, etc.), one or more user-specified criteria of interest, and/or other available user information. According to one implementation, a method for locale comparison includes defining a benchmark cluster for comparison to at least one locale cluster corresponding to a locale within a defined search zone. The locale cluster and the benchmark cluster correspond to different distributions of a set of locale attributes. The method further comprises assessing a similarity condition for the benchmark cluster and the locale cluster; and outputting one or more of the locales corresponding to the identified locale clusters satisfying the similarity condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

FIG. 6 illustrates exemplary predictive locale attributes that may be useful in locale characterization and/or comparison.

FIG. 7A illustrates example inputs to a system for locale characterization and comparison.

FIG. 7B illustrates example outputs to the system of FIG. 7A.

FIG. 7C illustrates a bar graph further illustrating example outputs to the system of FIGS. 7A and 7B.

FIG. 7D illustrates a locale attribute data for an example cluster type depicted on the bar graph of FIG. 7C.

Figure 9:
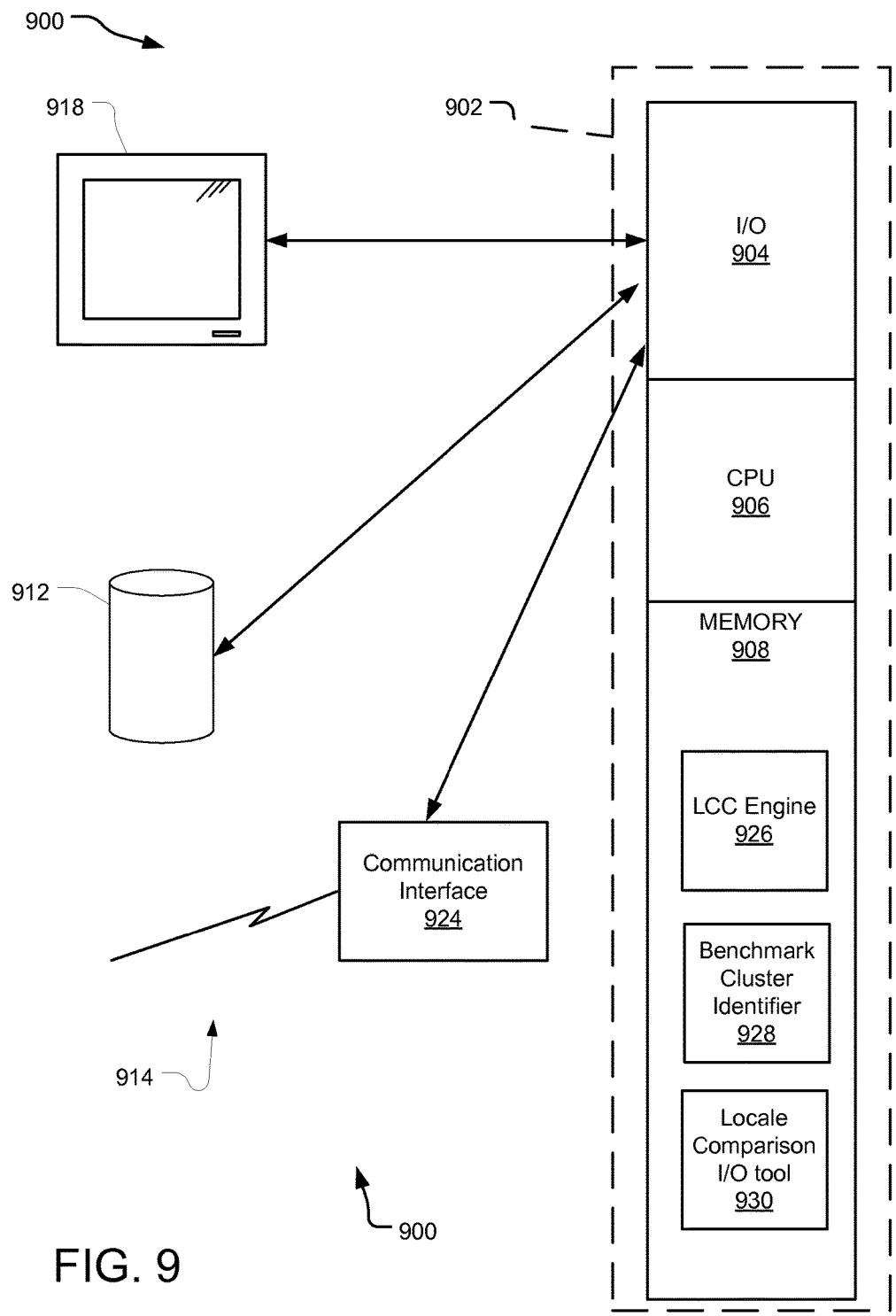

FIG. 9 discloses a block diagram of a computer system suitable for implementing one or more aspects of a system for locale characterization and comparison.

DETAILED DESCRIPTION

In some situations, potential real estate investors (e.g., renters, home-buyers, etc.) may expend considerable time and effort trying to learn about a "feel" or experience offered by a particular locale, such as a neighborhood or community. Comprehensive information about a given area is not readily accessible from any single source and may be difficult for an individual to seek out and compile in a meaningful way.

When an individual visits or moves to an unfamiliar locale, that individual may spend hours researching neighborhoods or area characteristics online, soliciting advice from friends or other individuals (e.g., real estate brokers) familiar with the area and/or physically visiting the different locales. A diverse number of user interests, priorities, and life circumstances may dictate which types of locale attributes are important in any given real estate query. For example, a recent college graduate moving across the country for a new job may seek an apartment rental in a dog-friendly area within walking distance of jogging paths with a high percentage of other single college graduates and an active nightlife scene. Other real estate inquiries may be deeply rooted in a certain type of "feel" or experience and less by tangible criteria (e.g., dog-friendly, active nightlife, etc.). For example, an individual moving across the country may want to find a place with a similar "feel" to the town where he or she grew up or went to college. Other inquiries may be influenced by an extensive variety of other demographics such as gender, race, age, income, property values, geographic information (e.g., parks, age of trees, bike lanes, etc.), climate data, educational opportunities, local exhibitions for music and the arts, etc.

Various implementations of the herein disclosed technology facilitate objective assessments of and/or comparisons between different locales based on a variety of statistical comparisons between different locale attributes. Such attributes may be represented, for example, as multi-dimensional clusters with attribute distributions stored as datasets in one or more public and/or private databases. As used herein, a "locale" refers to a geographical location generally including multiple residences, such as an apartment building, housing development, neighborhood, town, county, etc. Although the disclosed technology is discussed primarily with respect to web-based services related to real estate and property assessment, a variety of other applications are also contemplated including without limitation commercial data collection (e.g., franchise placement, venue determinations, etc.) and general user interest (e.g., comparing various locales as a matter of interest).

Figure 1:
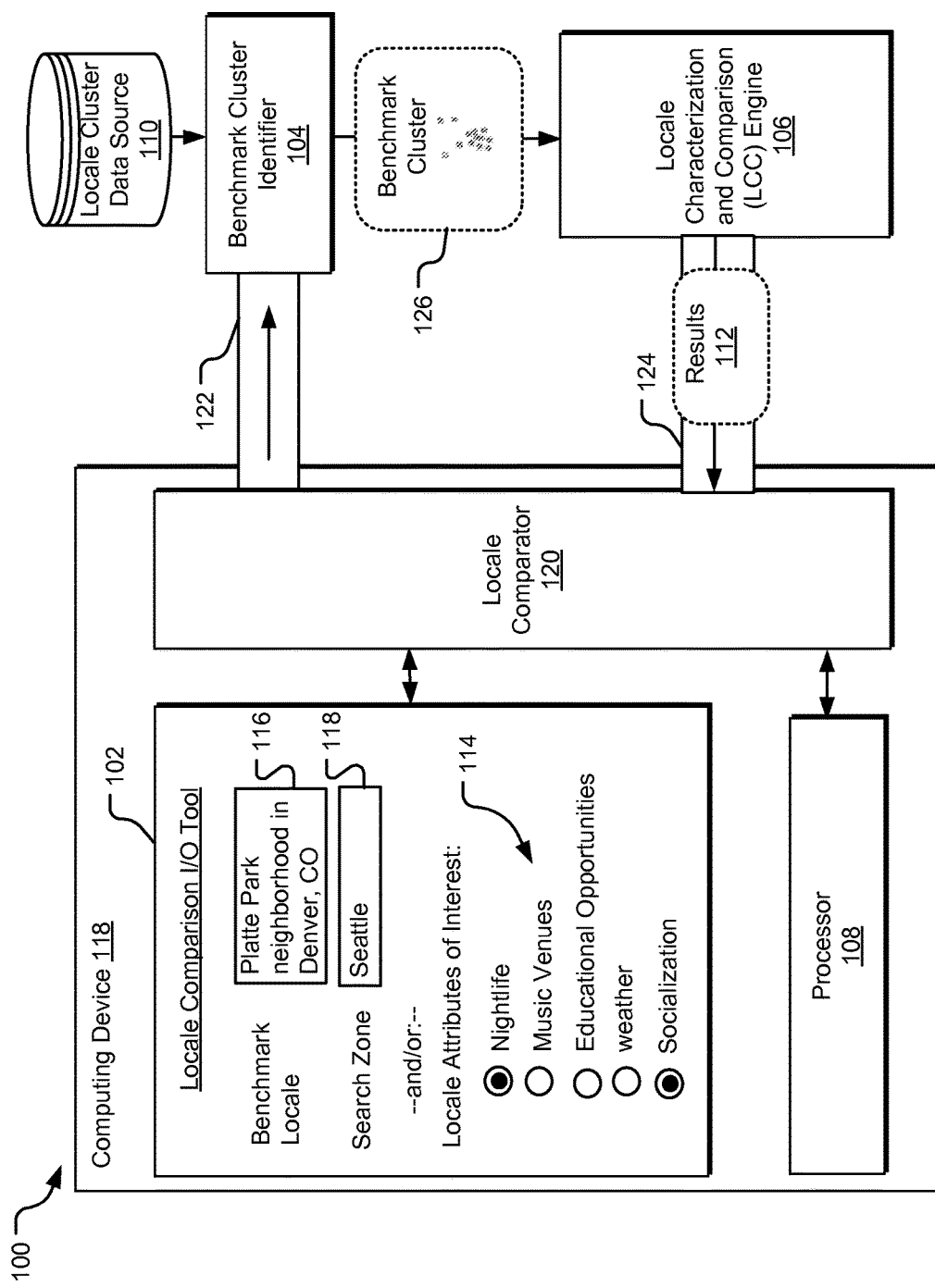
FIG. 1 illustrates an example system for locale characterization and comparison.

FIG. 1 illustrates one example system 100 for locale characterization and comparison. The system 100 includes a computing device 118 with a processor 108 for executing various applications and modules, such as a locale comparator 120. The locale comparator 120 is communicatively coupled via a number of data channels (e.g., data channels 122 and 124) to various modules that collectively facilitate objective characterization and/or comparison of different geographical locales. In particular, the locale comparator 120 is communicatively coupled to a benchmark cluster identifier 104 and a locale characterization and comparison (LCC) engine 106. The benchmark cluster identifier 104 and LCC engine 106 are shown external to the computing device 118; but may, in some implementations, be fully or partially integrated into software and/or hardware of the computing device 118.

In the system 100, the locale comparator 120 accepts user input by way of a local comparison I/O tool 102 (e.g., a graphical user interface) and provides such inputs to the benchmark cluster identifier 104 and/or LCC engine 106. Specific user inputs vary in different implementations; however, in FIG. 1, inputs to the locale comparison I/O tool include a benchmark locale 116 (e.g., Platte Park neighborhood in Denver, Colo.) and a search zone 118 (e.g., Seattle). The benchmark locale 116 is a geographical location corresponding to a particular distribution of locale attributes (not shown) that a user seeks to identify in association with another locale. In contrast, the search zone 118 identifies an area for the LCC engine 106 to search for locales similar to the benchmark locale 116. The search zone 118 may be, for example, a geographical area such as a country, state, county, city, or census block.

In the example of FIG. 1, the benchmark locale 116 (Platte Park neighborhood in Denver, Colo.) is not included within the search zone 118 (Seattle). This example may be pertinent when, for example, a user (not shown) is seeking to identify locales in an area of another state that he or she is unfamiliar with. In other implementations, the benchmark locale 116 is a region located within the search zone 118. For example, the benchmark locale 116 may be the Platte Park neighborhood in Denver, Colo., and the search zone 118 may be "Colorado." This example may be pertinent when, for example, a user is seeking other neighborhoods within Colorado that are similar to the Platte Park neighborhood in Denver. In still other implementations, the benchmark locale 116 is a state and the search zone 118 is a country. This example may be pertinent when, for example, the user 108 is seeking to identify one or more states similar to an identified "benchmark state" (e.g., the benchmark locale 116) in one or more respects. The above examples are meant to be non-exclusive. In various implementations, the benchmark locale 116 and search zone 118 may include areas of any size and/or location.

In the example of FIG. 1, a user provides inputs to the locale comparison I/O tool 102 to instruct the locale comparator 120 to search the city limits of Seattle for a locale having a distribution of locale attributes similar to the Platte Park neighborhood in Denver, Colo. The locale comparator 120 communicates the inputs of the locale comparison I/O tool 102 to the benchmark cluster identifier 104, and the benchmark cluster identifier 104 identifies a distribution of locale attributes exhibited by the benchmark locale 116. This distribution of locale attributes may, in different implementations, be represented by a variety of different metrics, and is herein referred to herein as a "benchmark cluster" (e.g., a benchmark cluster 126). One example of a benchmark cluster is a multi-dimensional array quantifying each of a number of locale attributes, such as one or more of population statistics based on age, race, gender, job type (e.g., white collar, blue collar), income data, property information, information on the local business market, educational opportunities, etc.

In FIG. 1, the benchmark cluster identifier 104 identifies (e.g., looks up, computes, or compiles) the benchmark cluster using one or a variety of data sources, such as a locale cluster data source 110. The benchmark cluster identifier 104 may also manipulate (e.g., normalize or weight) certain locale attributes to facilitate meaningful comparison to other distributions of locale attributes (e.g., other locales).

The benchmark cluster identifier 104 outputs the benchmark cluster 126 to the LCC engine 106, and the LCC engine 106 compares the benchmark cluster 126 to a number of other clusters, such as predefined clusters, dynamically computed clusters, etc., corresponding to other locales saved in a memory location. This comparison yields information (e.g., results 112) quantifying similarities and/or differences between the benchmark locale 116 and one or a number of locales within the search zone 118.

In different implementations, inputs to the locale comparison I/O tool 102 may vary. In one implementation, a user provides the locale comparison I/O tool 102 with locale attributes of interest 114 in lieu of the benchmark locale 116. In this case, the user may not define the benchmark locale 116. Rather, the benchmark cluster identifier 104 computes or selects the benchmark cluster based on the specified local attributes of interest 114. For example, the benchmark locale identifier 104 may compute or select a benchmark cluster from a number of pre-defined clusters, such as a cluster having higher values corresponding to the specified locale attributes of interest.

In yet another implementation, a user provides the locale comparison I/O 102 tool with locale attributes of interest 114 in addition to a benchmark locale 116, and the benchmark cluster identifier 104 assigns an increased weight to the specified locale attributes of interest 114 prior to selecting the benchmark cluster. If, for example, the user indicates that "nightlife" is a locale attribute of interest, the benchmark cluster identifier 104 assigns an increased weight to a locale attribute quantifying "nightlife" to influence the selection or computation of the corresponding benchmark cluster.

In another implementation, a user provides the locale comparison I/O 102 tool with an address and the benchmark cluster identifier 104 uses the address to identify the benchmark locale 116 and/or the benchmark cluster. For example, the user may supply his or her home address and the benchmark cluster identifier 104 may identify the benchmark cluster as a distribution of locale attributes defining the neighborhood that includes the specified address.

The results 112 output via the LCC engine 106 include one or more of the locales within the search zone 118 that have locale clusters similar to the benchmark cluster. For example, the results 112 may include a listing of the top five neighborhoods within the search zone 118 (e.g., Seattle) with associated distributions of locale attributes most similar to the benchmark cluster for the benchmark locale 116 (e.g., the Platte Park neighborhood in Denver, Colo.). In some implementations, the results 112 also include a summary of one or more locale clusters corresponding to the locales within the search zone 118 and/or the benchmark locale 116. For example, the summary may indicate that a particular locale has demographics and property values similar to the benchmark locale 116 (e.g., racial demographics, age demographics, etc.), but different social scenes (e.g., a variety of art complexes and music venues v. few art complexes or music venues).

Various modules and components of FIG. 1, such as the benchmark cluster identifier 104, the LCC engine 106, the locale comparator 120 and/or the locale comparison I/O tool 102 may be embodied in software and/or hardware of a tangible computer media. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. Both the benchmark cluster identifier 104 and the LCC engine 106 may be executed and controlled by a processor (not shown), such as a processor residing on a host device communicatively coupled to a storage media that embodies the LCC engine 106.

Figure 2:
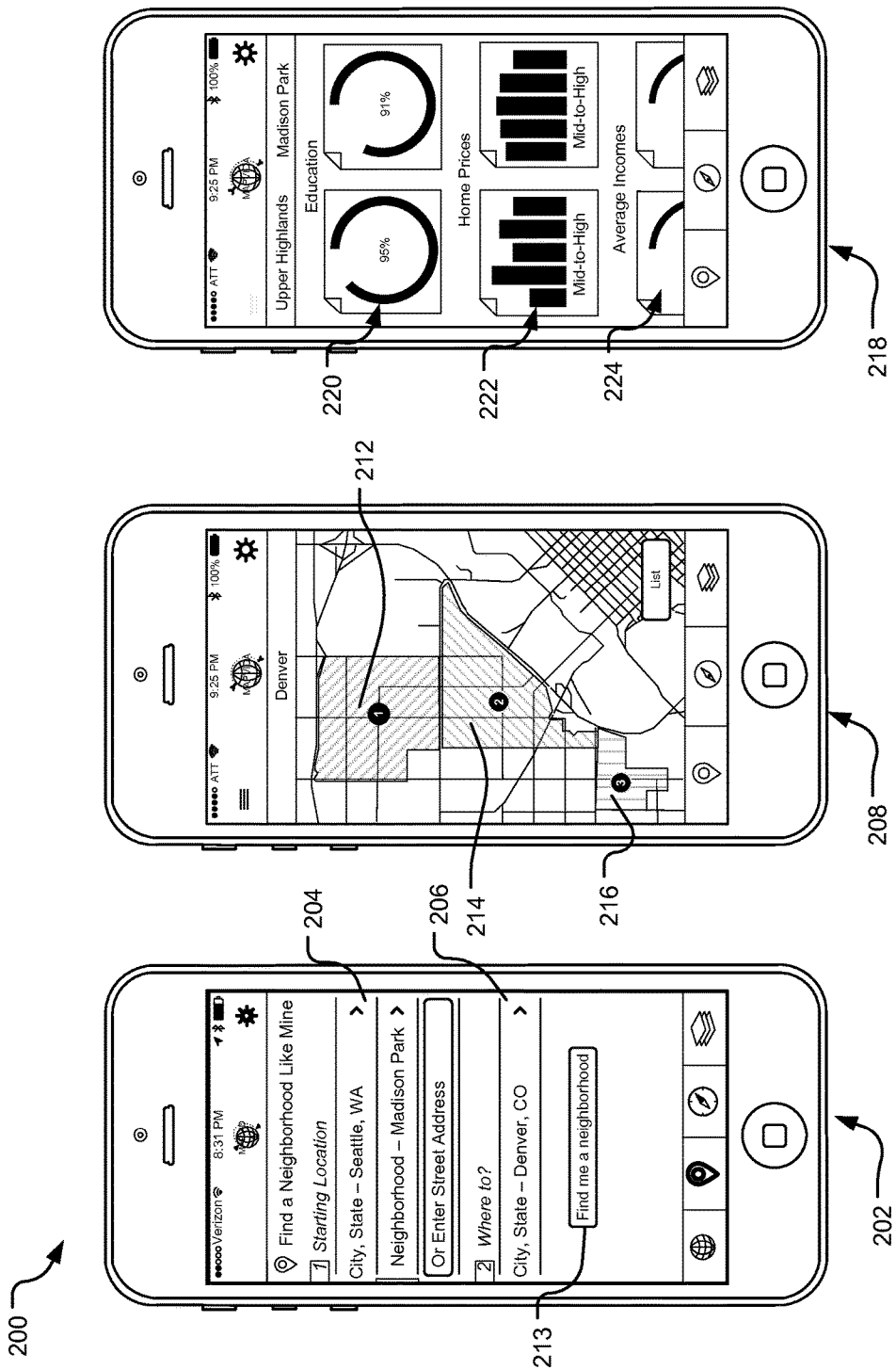
FIG. 2A illustrates a user input screen of another example system for locale characterization and comparison.
FIG. 2B illustrates an interactive map screen of the example system for locale characterization and comparison of FIG. 2A
FIG. 2C illustrates a locale comparison screen of the example system for locale characterization and comparison of FIGS. 2A and 2B.

FIGS. 2A, 2B and 2C illustrate different screens of a user interface presented by an example system for locale characterization and comparison 200. In particular, FIG. 2A illustrates a user input screen 202; FIG. 2B illustrates an interactive map screen 208; and FIG. 2C illustrates a locale comparison screen 218. The various screens of the user interface 200 may be displayable on any one or more of a variety of different types of electronic devices capable of accepting user input and transmitting data such as, for example, a smart phone, tablet, desktop or laptop computer, etc. User input may be provided differently in different implementations, such as by key or touchpad input, mouse input, voice dictation input, etc.

The user input screen 202 provides the system for locale characterization and comparison with two separate inputs: (1) a search zone 206 and (2) a benchmark locale 204. In the illustrated example, a user selects "Denver, Colo." for the search zone 206 and sets the benchmark locale 204 to "Madison Park" in "Seattle, Wash." The user initiates a query and comparison search by clicking an input submission button 213, which sends the inputs to other system modules, such as the benchmark cluster identifier and the LCC engine shown and described with respect to FIG. 1.

Responsive to receipt of the user input via the user input screen 202, the system for locale characterization and comparison 200 presents the user with the interactive map screen 208. The interactive map screen 208 illustrates a number of locales within the search zone 206 that the system for locale characterization and comparison 200 has identified as similar enough to the benchmark locale 204 to satisfy a predefined similarity condition. Similarity is based on a comparison of statistically significant locale attribute values and may assessed in a variety of suitable ways, some of which are discussed in greater detail below.

Although a number of suitable mathematical methods may be employed for locale comparison, similarity of locales is, in one implementation, assessed by comparing a benchmark cluster (e.g., a cluster representing the benchmark locale 204) to locale clusters representative of each of a number of different locales within the search zone 206. For example, each locale may be classified as a particular type of cluster defined by a distribution of locale attributes. Different clusters can be compared to one another by way of multi-dimensional cluster analysis. Cluster classification and analysis is discussed in greater detail below with respect to FIGS. 5-7.

The interactive map screen 208 of FIG. 2B illustrates three locales 212, 214 and 216 within the search zone of Denver, Colo. that have been identified as the "most similar" to the benchmark locale 204 of Madison Park in Seattle, Wash. in FIG. 2A. The interactive map screen 208 indicates geographical boundaries of each of the locales 212, 214, and 216, and also enumerates the three locales 212, 214, and 216 in order of decreasing similarity to the benchmark locale 204 (e.g., 1, 2, and 3 in FIG. 2B, where 1 indicates a greatest similarity level to the benchmark locale 204). In some implementations, a user can acquire further comparison information regarding each of the similar locales by touching, clicking, or otherwise selecting any one of the locales 212, 214, or 216 returned in response to the user query. For example, FIG. 2C illustrates an example locale comparison screen 218 presented to the user responsive to the user's selection of the locale 212 on the interactive map 208. The comparison screen 218 presents, in a side-by-side format, exemplary locale attribute data of the selected locale 212 (e.g., the Upper Highlands) and also the benchmark locale 204 (e.g., Madison Park).

More specifically, the locale comparison screen 218 in FIG. 2C presents graphics that compare the following categories of locale attributes: education, home prices, and average incomes of residents. As shown by the first set of plots 220, a comparison of education-related locale attributes indicates that the Upper Highlands and Madison Park offer similar educational opportunities. Likewise, a second set of plots 222 indicates that both the Upper Highlands and Madison Park offer comparable housing prices. Yet a third set of plots 224 (partially shown) illustrates similar average incomes for the two locales.

In some implementations, a user may be able to select any of the plots 220, 222, and 224 to be presented with further statistical information regarding each locale attribute or classification of locale attributes. For example, a user may select the second set of plots 222 and be directed to another screen that compares housing prices for different types of housing (e.g., purchase v. rental; commercial v. residential; and types of housing such as apartments, single family homes, etc.).

The above-described statistical analysis and system functionality facilitates a number of attribute-based comparisons at different levels of granularity (e.g., a general comparison based on a summary of all attributes (as in the interactive map screen 208 of FIG. 2B), a graphical comparison based on different categories of locale attribute values (as in the comparison screen 218 of FIG. 2C), and/or a comparison of individualized locale attribute values.

Figure 3:
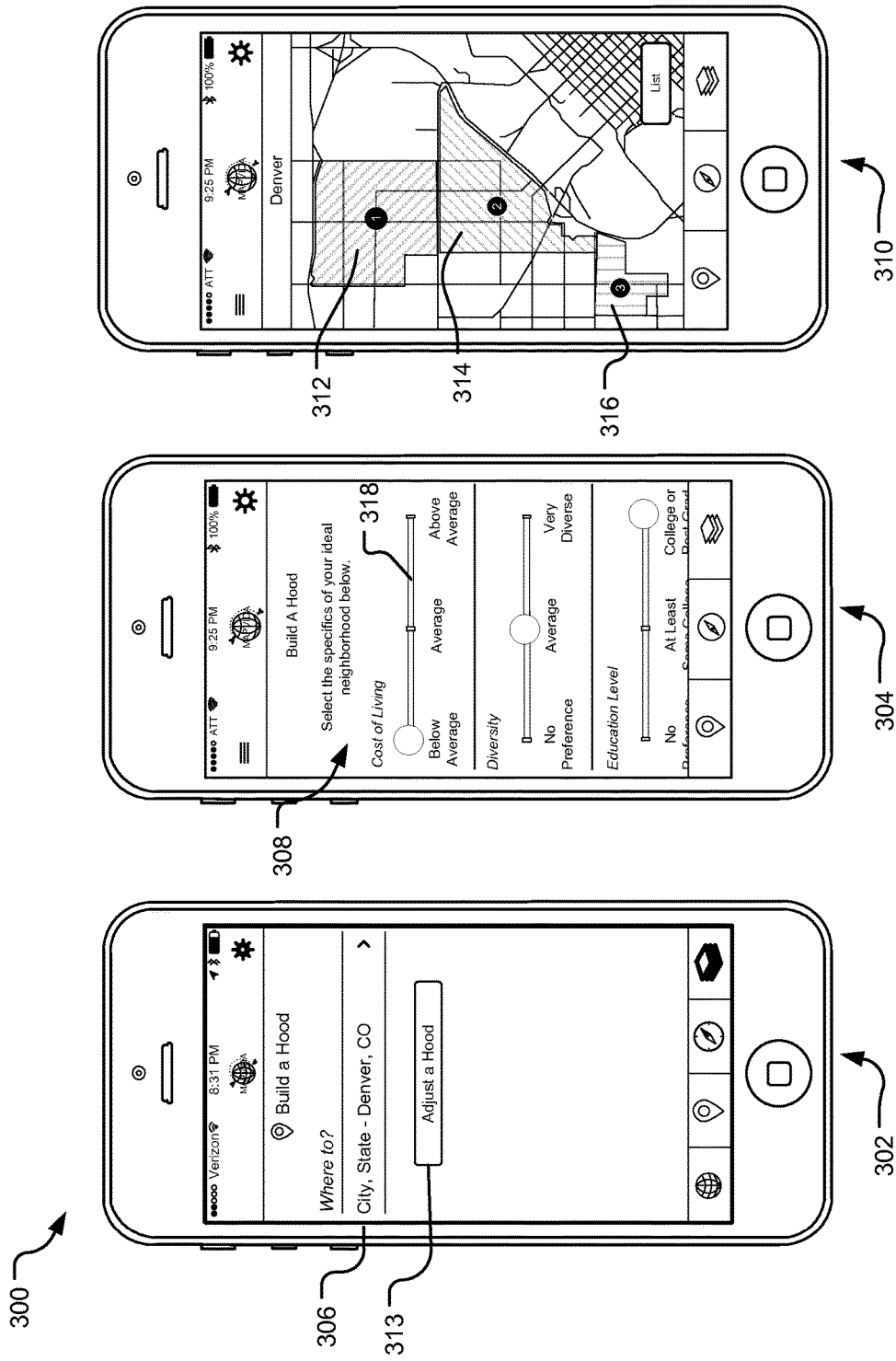
FIG. 3A illustrates a first input screen of another example system for locale characterization and comparison.
FIG. 3B illustrates a second input screen of the example system for locale characterization and comparison of FIG. 3A.
FIG. 3C illustrates an interactive map screen of the example system for locale characterization and comparison of FIGS. 3A and 3B.

FIGS. 3A, 3B, and 3C illustrate different screens of a user interface included in another example system for locale characterization and comparison 300 that allows a user to identify locales within a search zone 306 that satisfy a set of user-selectable criterion 308 (hereinafter, the criterion 308). More specifically, FIG. 3A illustrates a first input screen 302; FIG. 3B illustrates a second input screen 304; and FIG. 3C illustrates an interactive map output screen 310.

Using the first input screen 302 in FIG. 3A, a user specifies "Denver, Colo." as a search zone 306, indicating that he or she is interested in searching Denver, Colo. for locales satisfying a specified set of criteria. By clicking an input submission button 313, the user is directed to the second input screen 304 shown in FIG. 3B, which allows the user to specify a set of criterion 308 describing the "ideal" locale that the user seeks within the search zone 306. The criterion 308 is subsequently used to construct a benchmark cluster representing an "ideal" benchmark locale corresponding to a particular "benchmark" distribution of locale attributes. This benchmark cluster is, in turn, compared to other locale clusters associated with locales within the search zone (e.g., Denver, Colo.) to provide locale characterization and comparison information.

In FIG. 3B, the criterion 308 allows the user to customize locale attribute preferences to influence the locale search within the search zone 306 in FIG. 3A. For example, the second input screen 304 includes sliding scale tools (e.g., a sliding scale tool 318) to allow the user to select a preferred cost of living, diversity, and education level for his or her "ideal" locale within the search zone 306. In other implementations, the second input screen 304 allows a user to provide input relating to one or any other combination of other locale attributes. In different implementations, such input may be collected by a variety of tools via a number of different interface formats. In at least one implementation, the user clicks a radio button to supply a Boolean value indicating that a particular locale attribute is important (or not important) to the user.

The criterion 308 is used to weight different locale attributes or categories of locale attributes for a subsequent computation and/or selection of a benchmark cluster that is compared to other locale clusters associated with the search zone 306. If, for example, the user indicates that he or she prefers a "below average" cost of living, the system for locale characterization and comparison 300 may assign an increased weight to locale attributes quantifying availability of low-cost housing. Likewise, user input indicating a preference for a highly educated populous may cause the system for locale characterization and/or comparison 300 to assign an increased weight to one or more locale attributes relating to higher education.

In one implementation, the system for locale characterization and comparison 300 automatically selects some or all of the criterion 308 using available social media sources to identify various locale attributes of particular relevance to a current user. For example, the system for locale characterization and comparison 300 may access a user's social media information to determine that the user regularly purchases tickets to music concerts and enjoys fine dining. In this case, the criterion 308 may be automatically selected to indicate a preference for certain locale attributes such as "a high number of musical venues" and/or "a high number of fine dining restaurants." Social media information may be obtained, for example, by calling an API of a website and querying for text, or by parsing a feed of the social media website, such as an RSS feed.

Based on the criterion 308, the system for locale characterization and comparison 300 selects and/or weights different locale attributes and builds a benchmark cluster. The benchmark cluster is compared to locale clusters corresponding to a variety of locales within the search zone 306. When a comparison between the benchmark locale and a particular locale cluster satisfies a similarity condition, a locale associated with the locale cluster may be selected for output to the user in the interactive map screen 306.

FIG. 3C illustrates the interactive map screen 310 displaying query results provided by the system for locale characterization and comparison 300 responsive to a user query initiated via the inputs supplied in the first input screen 302 and the second input screen 304. The interactive map screen 310 indicates three locales 312, 314 and 316 within the search zone 306 (e.g., Denver) that are identified as having favorable locale attribute values based on the criterion 308 supplied by the user. In different implementations, the number of locales presented via the interactive map screen 310 may vary. For example, the user may be provided with a set number of locales (e.g., the top 5) or an otherwise limited number based on a satisfaction of a predetermined similarity condition.

FIGS. 4A, 4B, and 4C illustrate different screens of a user interface included in yet another example system for locale characterization and comparison 400. In particular, FIG. 4A illustrates an input screen 402; FIG. 4B illustrates an interactive mapping screen 408; and FIG. 4C illustrates a comparison screen 418. In one implementation, a user supplies the input screen 402 with two separate inputs: (1) a search zone 406 (e.g., Denver) and (2) a comparison region 410 (e.g., Seattle). By submitting the inputs via a user input submission button 413, the user initiates a locale characterization and comparison query that characterizes and compares each locale in the search zone 406 to a number of locales in the comparison region 410 based on associated distributions of locale attributes.

Responsive to receipt of the user input provided via the input screen 402 of FIG. 4A, the system of locale comparison and characterization 400 re-maps the entire search zone 406 according to similar locale attributes and presents the re-mapping to the user via the interactive mapping screen 408 of FIG. 4B. This mapping translates the entire search zone, re-labeling individual locales (e.g., neighborhoods) using graphical distinctions, such as different colors or shading, to illustrate locales within the search zone having similar locale attributes. In addition, the mapping screen 408 labels each locale within the search zone 406 (e.g., Denver) with a label identifying a similar (e.g., similarly classified) locale in the comparison region 410 (e.g., Seattle, Wash.). For example, a neighborhood 414 representative of a Denver neighborhood "Stapleton" is labeled "Beacon Hill" to indicate that the Stapleton neighborhood in Denver satisfies a similarity metric with the Beacon Hill neighborhood in Seattle. In effect, the interactive mapping screen 408 of FIG. 4B allows the user to compare locales within the search zone to one another and also to a number of locales within the comparison region 410.

In one implementation, the above-described locale comparison is based on a classification assigned to each individual locale within the search zone 406 and also within the comparison region 410. For example, each neighborhood within the cities of Denver and Seattle may be classified as one of a set number of predefined cluster types. For example, the neighborhood of "Stapleton" in Denver, Colo. may be classified as a first cluster type ("Cluster 1") if Stapleton has a distribution of locale attribute values that satisfies a similarity condition when compared to a benchmark distribution defined by the cluster type (e.g., "Cluster 1").

Figure 5:
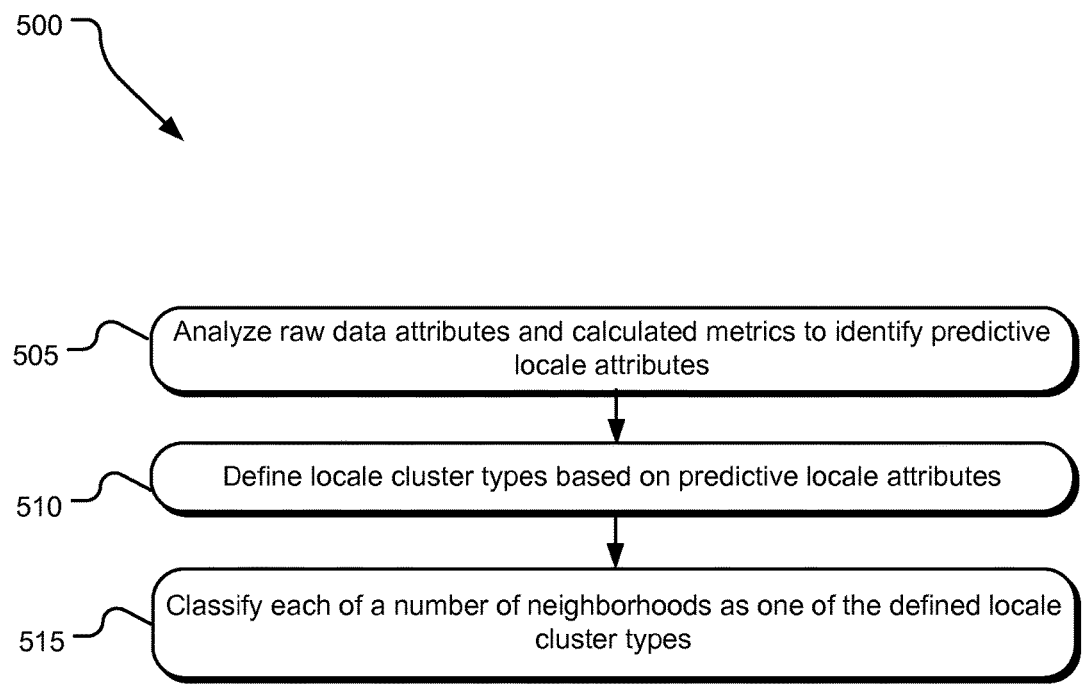
FIG. 5 illustrates example operations for classifying a locale according to one example cluster classification and analysis scheme.

Example locale classifications according to predefined cluster types is described in greater detail with respect to FIG. 5.

Figure 4:
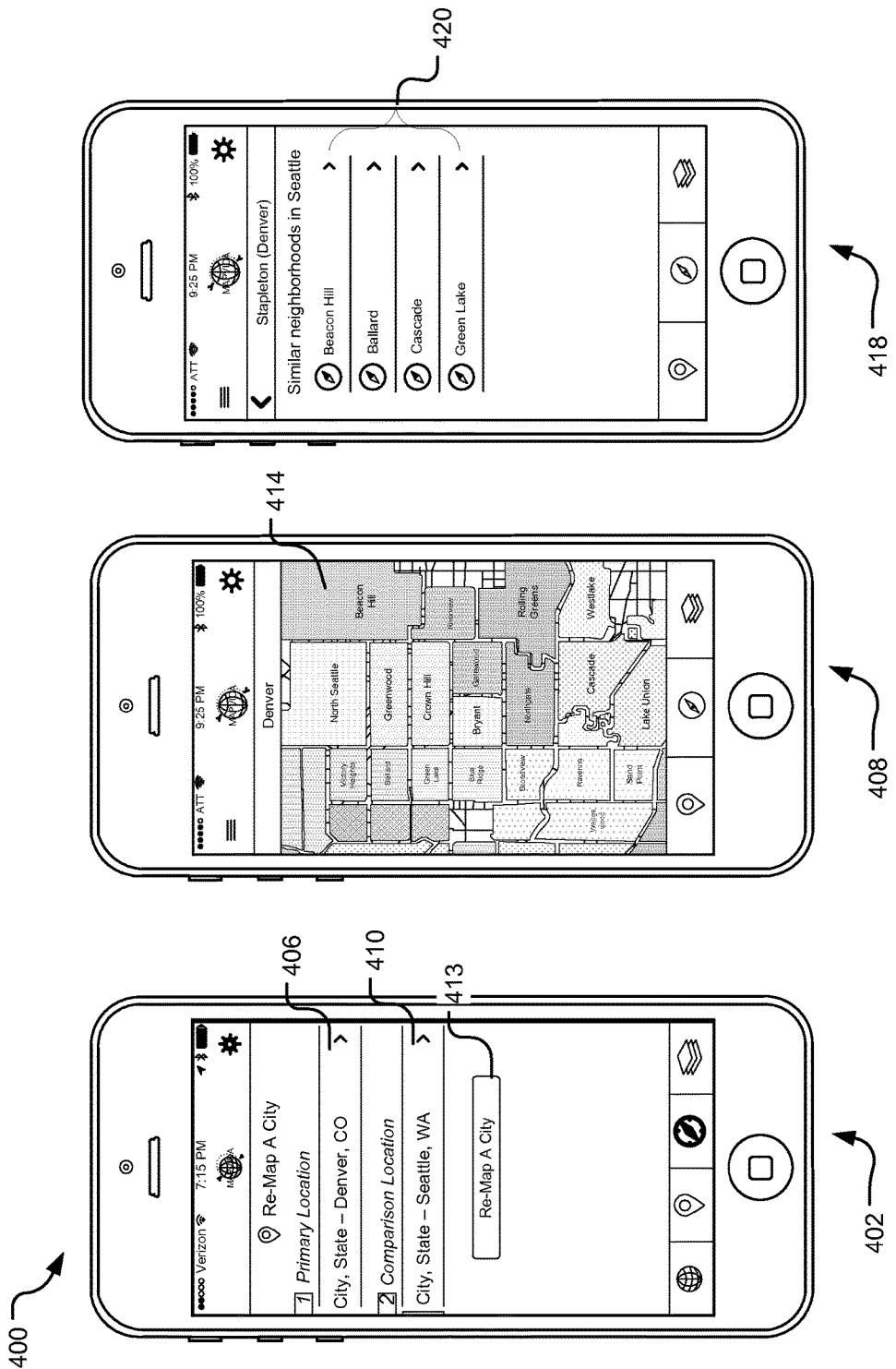
FIG. 4A illustrates an input screen of yet another example system for locale characterization and comparison.
FIG. 4B illustrates an interactive mapping screen of the example system for locale characterization and comparison of FIG. 4A.
FIG. 4C illustrates a locale comparison screen of the example system for locale characterization and comparison of FIGS. 4A and 4B.

The implementation of FIG. 4 further allows the user to select any of the illustrated locales in the interactive mapping screen 408 of FIG. 4B to compare the selected individual locale with a listing of one or more familiar locales within the initially-specified comparison region 410 (e.g., Seattle).

For example, the comparison screen 418 of FIG. 4C provides the user with a list of locales within the comparison region 410 (e.g., familiar locales 420) that satisfy a similarity condition with a particular selected locale from the interactive mapping screen 408. In the illustrated example, the user selects a suburb 414 from within the search zone 406 (Denver, Colo.) and is presented with a list of familiar locales 420 within the comparison region 410 (Seattle, Wash.). The suburb 414 represents the neighborhood of Stapleton in Denver, Colo. and is labeled "Beacon Hill" because the system 400 has identified Stapleton as "most similar" to Beacon Hill in Seattle, Colo. By selecting the suburb 414, the user can see that the Seattle neighborhoods of Beacon Hill, Ballard, Cascade, and Green Lake are identified by the system as similar to the Stapleton neighborhood in Denver. In one implementation, the familiar locales 420 presented in the comparison screen 418 are similarly or identically classified by the cluster analysis methodology described in greater detail with respect to FIG. 5.

FIG. 5 illustrates example operations 500 for classifying a locale according to a cluster classification and analysis scheme. In general, "clustering" refers to unsupervised learning to determine commonalities within groups using a multi-dimensional analysis. Clustering provides for empirical comparison of naturally different data populations and, in the current application, groups together statistically similar locales.

Using the operations 500, a number of "locale cluster types" are defined based on a distribution of locale attributes corresponding to locales of an input dataset. Collectively, the locale cluster types represent all or a majority of the locales of the input dataset such that each individual locale can be classified as one of the defined locale cluster types. For example, 30 locale cluster types may be defined and each individual locale of the input dataset has a corresponding locale cluster that can be classified as one of the predefined locale cluster types (e.g., Cluster-1 through Cluster-30).

To accomplish the forgoing, an analysis operation 505 first analyzes locale cluster data defining a distribution of locale attributes for a number of different locales. The preliminary analysis operation 505 analyzes the distributions of locale attributes to identify a subset of the locale attributes that are "predictive." A predictive locale attribute is, for example, a feature that helps to distinguish a particular locale cluster from other (e.g., most similar) locale clusters, such as a feature that is likely to vary dramatically between different clusters including clusters with many similar locale attributes. Each different cluster possesses a unique distribution of these predictive variables. Therefore, the combination of these predictive locale attributes can be used to classify a particular locale (e.g., neighborhood) according to a predefined cluster type classification, such as via the methods described in further detail below. A few exemplary predictive locale attributes are shown in FIG. 6 (discussed in greater detail below).

The analysis operation 505 is performed by way of a comprehensive analysis of raw data attributes and use of calculated metrics from the data. In one example implementation, predictive locale attributes are identified using a variable clustering (e.g., principal component analysis) technique. For example, each of the locales of the input dataset may be represented as an m-dimensional locale cluster, where each dimension of the locale cluster represents a different locale attribute. From each locale cluster, at least one "predictive locale attribute" is identified. For example, a predictive locale attribute may be a variable that is most correlated with other variables within that cluster and least correlated with a next closest cluster (e.g., where "closest" is, for example, measured in terms of Euclidean distance, R-squared, etc.). In one implementation, the locale clusters are subsequently redefined to include the predictive locale attributes and to exclude other locale attributes determined to be non-predictive.

Once predictive locale attributes are identified, a defining operation 510 defines a number of different locale cluster types based on the distribution of locale clusters of the input dataset. According to one implementation, an optimal number of locale cluster types is identified by computing, for each individual locale cluster, a sum of square distances (e.g., distance between a centroid of each locale cluster and each associated locale attribute value). Plotting a sum of square distances curve over all locale attribute distributions allows for identification of sharp bends in the curve useful in determining an optimal number of locale cluster types. More specifically, these "sharp bends" (e.g., local maxima or minima) indicate a number of locale cluster types that allow for mathematical classification of the locales of the dataset into an optimal number of distinctive cluster types. Once the optimal number of cluster types is determined, a corresponding number of locale cluster types may be defined by a centroid and a corresponding distribution of locale attribute values. For example, the centroids may be selected to be equidistant from one another along an axis.

After the different locale cluster types are defined via the defining operation 510, a classification operation 515 classifies each of the locale clusters of the input dataset as one of the defined locale cluster types. In one implementation, this classification is performed according to a Euclidean distance calculation method. For example, distance is calculated from a centroid of a locale cluster representing a particular neighborhood and the centroid of each of the predefined cluster types. The predefined cluster type corresponding to the shortest of the calculated distances is used to classify the particular neighborhood. In some implementations, certain locale attributes are weighted in a predefined manner to influence cluster classification.

In the above-described manner, each locale (e.g., a neighborhood) in an input data set is classified as one of a predefined number of cluster types. This information is saved in one or more databases and used for subsequent locale characterization and comparison, such as to identify similarly classified locales in different geographical regions.

FIG. 6 illustrates exemplary predictive locale attributes 602 with values (not shown) representing an example locale cluster 600. In one implementation, each individual locale (e.g., a neighborhood) can be represented as a locale cluster and further classified as a particular "predefined cluster type." Different clusters and/or different cluster types can be mathematically compared to one another in whole or in part to identify similarities meaningful to a particular user of a system for locale characterization and comparison.

In FIG. 6, each of the example locale attributes 602 is paired with a description 606 and an associated attribute category 604 (e.g., "business type," "demographic," "economic," "housing," "social"). For example, a locale attribute "P_pop_education" is of the attribute category "education" and represents the percentage of population in the associated locale with a specified level of education (e.g., college degree, post-grad degree, etc.). In contrast, a variable: "P_pop_MEY12" is of the attribute category "demographic" and represents the percentage of the population of the associated locale in an age group "old" (e.g., a predefined age range).

In some implementations, a locale cluster may represent a weighting or normalization of certain locale attribute values according to category. For example, a cluster may include economic locale attribute values that are weighted more heavily than demographic attribute values or vice versa. The exemplary predictive locale attributes 602 are non-exclusive and included to provide an overview of some information that may be represented within a locale cluster.

In some implementations, social media information is used as a locale attribute. For example, information from available social media feeds (e.g., Twitter®, Facebook®, etc.) may be aggregated from a certain city and keywords appearing in the user-generated social media may be used to characterize the city. In this sense, locale classification (e.g., according to predefined cluster type) may be based in full or in part on social media information originating from within each locale.

Although not shown in FIG. 6, some locale attributes may also take into account personal information obtained from the user initiating the query. For example, a user may provide information such as education level, income, and sexual preferences and one or more locale attributes especially important to the user in identifying similar locales (e.g., such as the criterion 308 in FIG. 3B). A system for locale characterization and comparison may selectively weight or otherwise utilize predictive locale attributes associated with the personal information to generate a benchmark cluster for subsequent comparison to other locale clusters of locales within a search zone. In other words, user inputs can be used to determine a predefined cluster type that best matches user preferences.

FIG. 7A illustrates example inputs to a system for locale characterization and comparison 700 (hereinafter the "system 700"). According to one implementation, the system 700 classifies individual locales according to a predefined set of cluster types to provide a meaningful comparison between locales in different geographical areas.

The exemplary inputs to the system 700 include 3,536 locale clusters spanning four different U.S. cities (e.g., City A, City B, City C, City D.). In one implementation, each of the 3,536 locale clusters input to the system 700 is a multi-dimensional distribution of locale attributes. Of the 3,536 input locale clusters, 654 correspond to locales in City A; 778 correspond to locales in City B; 721 correspond to locales in City C; and 1,383 correspond to locales in City D.

FIG. 7B illustrates example outputs to the system 700 including a cluster type classification (e.g., Cluster-1 through Cluster-15) for each of the 3,536 input locale clusters. In one implementation, the various cluster types Cluster-1 through Cluster 15 are defined in the same or similar manner as described with respect to FIG. 5 (e.g., the classification operation 515).

FIG. 7C illustrates a bar graph 702 of example outputs to the system 700. The bar graph 702 enumerates cluster type classifications on the x-axis and a percentage distribution of each cluster type between four different example locales on the y-axis. For example, 54% of the locales classified as Cluster-2 (of the 15 cluster types) are in City A; 16% of the locales classified as Cluster-2 are in City B; 21% of the locales classified as Cluster-2 are in City C; and 9% of the locales classified as Cluster-2 are in City D.

FIG. 7D illustrates cluster information for an example cluster type (e.g., "Cluster-2") in the system 700 depicted on the bar graph of FIG. 7C. In one implementation, each cluster type corresponds to a distribution of locale attributes representing the average values of the corresponding locale clusters. For example, an average of 62% of the population from locales classified as "Cluster-2" are in a certain predefined age group (e.g., "Population in age group old") and recent data indicates that this number is decreasing. Also, an average of 12% of households in locales classified as "Cluster-2" have a particular number of workers contributing to household income (e.g., as represented by the metric "% Households with number of workers"). Other locale attribute values shown in FIG. 7D are mean to be exemplary and are by no means exclusive of the locale attribute values employed or embodied by the exemplified cluster type ("Cluster-2") or by any other cluster type.

By classifying each of the 3,536 input locales according to one of 15 different predefined cluster types (as generally explained above with respect to FIGS. 7A-7D), individual locales in the different 4 locales (City A, City B, City C, and City D) can be compared to one another in a meaningful way. It should be understood that various implementations may employ varying numbers of predefined cluster types less than or greater than the 15 predefined cluster types defined by the system 700.

Figure 8:
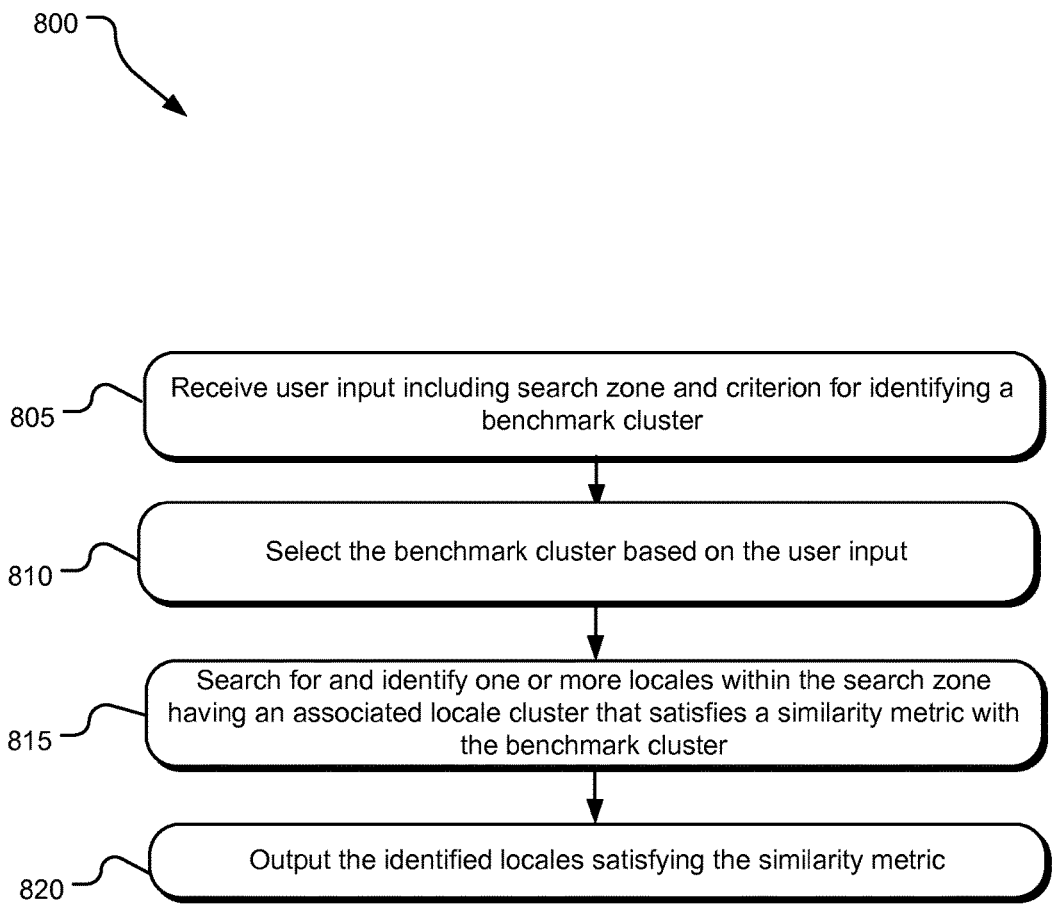
FIG. 8 illustrates example operations for locale characterization and comparison.

FIG. 8 illustrates example operations 800 for locale characterization and comparison. A receiving operation 805 receives user input including a search zone for identifying one or more locales with associated locale clusters similar to a benchmark cluster. In one implementation, the user input includes criterion for defining the benchmark cluster. For example, the user may specify that he or she is looking for a locale with a growing job market, an average income above $75,000, and/or one or more other criterion. In yet other implementations, the user input specifies a benchmark cluster by directly or indirectly selecting a benchmark locale that is saved in association with a particular cluster. For example, the user may specify an address of a residence included in the benchmark locale or otherwise specify a particular locale (e.g., neighborhood, city, state, etc.) to use as the benchmark locale.

A selection operation 810 selects a benchmark cluster based on the user input. In one implementation, the benchmark cluster is an m-dimensional cluster defining a distribution of locale attributes. In the same or another implementation, the benchmark cluster is one of a number of predefined "cluster types," such as a cluster type associated in memory with the identified benchmark locale. For example, the user may specify a neighborhood (e.g., Platte Park in Denver, Colo.) as the benchmark locale. If the specified neighborhood has been previously classified as a particular cluster type (e.g., Cluster-2), the selection operation 810 selects the particular cluster type (e.g., Cluster-2) as the benchmark cluster. In another implementation, the benchmark cluster is dynamically determined based on user input. For example, the user provides one or more criterion of interest and, based on such criterion, the selection operation 810 selects a predefined cluster type to be the benchmark cluster. In still other implementations, the benchmark cluster is selected based on a dynamically computed metric, such as a metric that quantifies a distribution of locale attributes and/or more criterion of interest to a user.

A search and identification operation 815 searches for and identifies one or more locales within the search zone associated with a locale cluster that satisfies a similarity metric with the identified benchmark cluster. For example, the search and identification operation 815 may search for and identify locales within the search zone that are associated in memory with the same cluster type as the benchmark cluster. If, for example, the benchmark cluster is a cluster type identified as "Cluster-4" (e.g., of 'X' different predefined cluster types), the search and identification operation 815 searches for and identifies locales within the search zone that are also classified as Cluster-4. In different implementations, locale classification may be performed according to any of a number of suitable methods including various cluster analysis techniques, Euclidean distance comparisons, R-squared, and/or other statistical comparisons of different locale attribute values, etc.

Some implementations may not utilize predefined "locale cluster types" (e.g., as described with respect to FIG. 5). In one such implementation, the benchmark cluster is computed based on a metric incorporating user input. The similarity metric compares locale attribute values of the benchmark cluster to one or more locale attribute values of locale(s) within the search zone, such as via an R-squared, Euclidean distance or any other suitable comparison metric.

An output operation 820 outputs locales within the search zone that correspond to locale clusters determined to satisfy a similarity metric with the benchmark cluster. In one implementation, the output operation 820 outputs locales within the search zone determined to be "most similar" to the benchmark cluster based on assessment of the similarity metric.

FIG. 9 discloses a block diagram of a computer system 900 suitable for implementing one or more aspects of system for locale characterization and comparison. The computer system 900 is capable of executing a computer program product embodied in a tangible computer-readable storage medium to execute a computer process. Data and program files may be input to the computer system 900, which reads the files and executes the programs therein using one or more processors. Some of the elements of a computer system 900 are shown in FIG. 9 wherein a processor 902 is shown having an input/output (I/O) section 904, a Central Processing Unit (CPU) 906, and a memory section 908. There may be one or more processors 902, such that the processor 902 of the computing system 900 comprises a single central-processing unit 906, or a plurality of processing units. The processors may be single core or multi-core processors. The computing system 900 may be a conventional computer, a distributed computer, or any other type of computer. The described technology is optionally implemented in software loaded in memory 908, a storage unit 912, and/or communicated via a wired or wireless network link 914 on a carrier signal (e.g., Ethernet, 3G wireless, 6G wireless, LTE (Long Term Evolution)) thereby transforming the computing system 900 in FIG. 9 to a special purpose machine for implementing the described operations.

The I/O section 904 may be connected to one or more user-interface devices (e.g., a keyboard, a touch-screen display unit 918, etc.) or a storage unit 912. Computer program products containing mechanisms to effectuate the systems and methods in accordance with the described technology may reside in the memory section 908 or on the storage unit 912 of such a computer system 900.

A communication interface 924 is capable of connecting the computer system 900 to a network via the network link 914, through which the computer system can receive instructions and data embodied in a carrier wave. When used in local area networking (LAN) environment, the computing system 900 is connected (by wired connection or wirelessly) to a local network through the communication interface 924, which is one type of communications device. When used in a wide-area-networking (WAN) environment, the computing system 900 typically includes a modem, a network adapter, or any other type of communications device for establishing communications over the wide area network. In a networked environment, program modules depicted relative to the computing system 900 or portions thereof, may be stored in a remote memory storage device. It is appreciated that the network connections shown are examples of communications devices for and other means of establishing a communications link between the computers may be used.

In an example implementation, a locale characterization and comparison (LCC) engine 926 (e.g., the LCC engine 106 of FIG. 1), a benchmark cluster identifier 928 (e.g., the benchmark cluster identifier 104 of FIG. 1), and a locale comparison I/O tool 930 are embodied by instructions stored in memory 908 and/or the storage unit 912 and executed by the processor 902. One or more relational databases storing cluster data used in comparing different locales may be stored in the disc storage unit 912 or other storage locations accessible by the computer system 900. In addition, the computer system 900 may utilize a variety of online analytical processing tools to mine and process data from the relational databases. Further, local computing systems, remote data sources and/or services, and other associated logic represent firmware, hardware, and/or software, which may be configured to characterize and compare different locales. A locale characterization and comparison engine (LCC) may be implemented using a general purpose computer and specialized software (such as a server executing service software), a special purpose computing system and specialized software (such as a mobile device or network appliance executing service software), or other computing configurations. In addition, modules of the LCC engine may be stored in the memory 908 and/or the storage unit 912 and executed by the processor 902.

The implementations of the invention described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data together with the attached Exhibit provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method for managing data for geographic locale mapping, the method comprising:
   associating in a database a different geographic locale with each one of multiple locale clusters that are individually defined by a distribution of locale attributes;
   associating in the database each one of the multiple locale clusters with a select one of multiple predefined cluster types, the predefined cluster types being derived in a clustering analysis of the locale attributes for the multiple locale clusters and each classifying a subgroup of the multiple locale clusters having locale attributes with a demonstrated correlation to one another;
   determining, with a processor, a benchmark cluster type based on inputs received from a user interface, the benchmark cluster type being one of the multiple predefined cluster types classifying locale clusters in a database;
   identifying a subset of the locale clusters in the database that correspond to a user-specified search zone and that are also classified in the database in association with the benchmark cluster type, the user-specified search zone being associated with locales corresponding to a plurality of the multiple predefined cluster types; and
   outputting one or more geographic locales corresponding to the identified subset of the locale clusters.

2. The method of claim 1, wherein the method further comprises:
   receiving a benchmark locale;
   determining the benchmark cluster type based on the benchmark locale;
   outputting an ordered ranking of the one or more geographic locales corresponding to the identified subset of the locale clusters, the ranking defining relative similarity of the benchmark locale to each of the geographic locales in the ordered ranking.

3. The method of claim 1, further comprising:
   receiving user input including the search zone and information for determining the benchmark cluster type.

4. The method of claim 3, wherein the benchmark cluster type is determined based on one or more locale attributes indicated via the user input.

5. The method of claim 1, further comprising:
   receiving user input including the search zone and a benchmark locale, the benchmark locale associated in a memory location with the benchmark cluster type.

6. The method of claim 1, wherein each of the multiple predefined cluster types is defined based on a subset of predictive attributes identified from the locale attributes.

7. The method of claim 1, wherein defining the benchmark cluster type further comprises selecting a predefined cluster type stored in memory in association with a benchmark locale specified by user input.

8. A system for geographic locale mapping and cluster data management, the system comprising:
   memory;
   a processor;
   a database stored in the memory, the database associating a different geographic locale with each one of multiple locale cluster that are individually defined by a distribution of locale attributes and further associating each one of the multiple locale clusters with a select one of multiple predefined cluster types, the predefined cluster types being derived in a clustering analysis of the locale attributes for the multiple locale clusters and each classifying a subgroup of the multiple locale clusters having locale attributes with a demonstrated correlation to one another;
   a benchmark cluster identifier stored in the memory and executable by the processor, the benchmark cluster identifier configured to identify a benchmark cluster type based on user input received through a user interface, the benchmark cluster type being one of multiple predefined cluster types classifying locale clusters in a database; and
   a locale characterization and comparison (LCC) engine stored in the memory and executable by the processor, the LCC engine configured to:
   identify a subset of the locale clusters in the database that correspond to a user-specified search zone and that are also classified in the database in association with the benchmark cluster type, the user-specified search zone being associated with locales corresponding to a plurality of multiple different predefined cluster types; and
   output one or more geographic locales corresponding to the identified subset of the locale clusters.

9. The system of claim 8, wherein the LCC engine outputs an ordered ranking of the one or more geographic locales corresponding to the identified subset of the locale clusters, the ranking defining relative similarity between a user-specified benchmark locale and each of the geographic locales in the ordered ranking.

10. The system of claim 8, wherein the benchmark cluster identifier identifies the benchmark cluster type based on a prioritization awarded to one or more locale attributes indicated via the user input.

11. The system of claim 8, wherein the user input specifies the search zone.

12. The system of claim 8, wherein the user input includes a benchmark locale that is associated in memory with the benchmark cluster type and a distribution of locale attributes.

13. The system of claim 8, wherein each of the multiple predefined cluster types is defined based on a subset of predictive attributes identified from the locale attributes.

14. The system of claim 8, wherein the benchmark cluster type is stored in memory in association with at least one benchmark locale and the user specifies the at least one benchmark locale in the user input.

15. A method for data management and geographical locale mapping, the method comprising:
   defining, via a graphical user interface, a geographical search zone and information for selecting a benchmark distribution of locale attributes for comparison to actual distributions of locale attributes for locales within the geographical search zone; and
   receiving, in the graphical user interface, the at least one geographical location within the search zone having a distribution of locale attributes that satisfies a similarity condition with the benchmark distribution of locale attributes.

16. The method of claim 15, wherein defining the information for selecting the benchmark distribution of locale attributes further comprises:
   specifying a benchmark locale that is associated in a memory location with the benchmark distribution of locale attributes.

17. The method of claim 15, wherein the at least one geographical location includes multiple geographical locations and receiving the at least one geographical location further comprises:

receiving an ordered ranking of the multiple geographical locations, the ranking indicating relative similarity of the benchmark distribution of locale attributes and distributions of locale attributes associated with each of the multiple geographical locations.

18. The method of claim 15, wherein defining the information for selecting the benchmark distribution of locale attributes further comprises:

supplying criterion for prioritizing one or more of the locale attributes.

19. A method for classifying geographical locales based on associated multi-dimensional distributions of locale attributes to provide objective comparison of two or more of the classified locales, the method comprising:

analyzing the associated distributions of locale attributes to identify a predictive subset of the locale attributes;

defining a number of locale cluster types based on the predictive subset of the locale attributes; and classifying each of the locales as one of the defined locale cluster types.

20. The method of claim 19 further comprising:

plotting a sum of square distances curve for the distributions of locale attributes; and identifying the locale cluster types based on locale maximum or minimum on the plotted curve.

21. One or more non-transitory computer-readable storage media encoding computer-executable instructions for executing on a computer system a computer process comprising:

associating in a database a different geographic locale with each one of multiple locale clusters that are individually defined by a distribution of locale attributes;

associating in the database each one of the multiple locale clusters with a select one of multiple predefined cluster types, the predefined cluster types being derived in a clustering analysis of the locale attributes for the multiple locale clusters and each classifying a subgroup of the multiple locale clusters having locale attributes with a demonstrated correlation to one another;

determining a plurality of benchmark clusters corresponding to different geographical locales in a first geographical zone, each benchmark cluster associated with one of the multiple predefined cluster types;

determining a plurality of comparison clusters corresponding to different geographical locales in a second geographical zone, each comparison cluster associated in the database with one of the multiple predefined cluster types;

individually comparing each of the benchmark clusters to each of the comparison clusters; and for each of the benchmark clusters, outputting one or more of the comparison clusters associated with a same one the multiple predefined cluster types as the corresponding benchmark cluster.

22. The one or more non-transitory computer-readable storage media of claim 21, wherein the first geographical zone and the second geographical zone are defined by user input.

23. The one or more non-transitory computer-readable storage media of claim 21, further comprising:

outputting a map that pairs each of the locales in the first geographical zone with one of the locales in the second geographical zone.

24. The method of claim 1, wherein identifying the subset of the locale clusters in the database that correspond to the user-specified search zone is performed without computing a metric to compare one or more locale clusters to the benchmark cluster.

* * * * *